(12) United States Patent
Bartilson et al.

(10) Patent No.: US 7,639,935 B2
(45) Date of Patent: Dec. 29, 2009

(54) ZOOM CONTROL

(75) Inventors: Lars Bjorn Pontus Bartilson, Bunkeflostrand (SE); Johan Peter Cederberg, Rydeback (SE)

(73) Assignee: Sony Ericsson Mobile Communications AB, Lund (SE)

( * ) Notice: Subject to any disclaimer, the term of this patent is extended or adjusted under 35 U.S.C. 154(b) by 325 days.

(21) Appl. No.: 11/692,260

(22) Filed: Mar. 28, 2007

(65) Prior Publication Data

US 2008/0240698 A1 Oct. 2, 2008

(51) Int. Cl.
G03B 17/00 (2006.01)
G03B 13/02 (2006.01)
G03B 13/10 (2006.01)
H04N 5/228 (2006.01)
H04N 9/68 (2006.01)

(52) U.S. Cl. .............................. 396/78; 396/53; 396/82; 396/287; 396/374; 396/379; 348/208.2; 348/240.99; 348/240.3; 348/234

(58) Field of Classification Search .................. 396/78, 396/79, 80, 82, 287, 289, 50, 51, 374, 376, 396/379, 380, 381, 53; 348/208.14, 240.99, 348/240.1, 240.2, 240.3, 234, 208.2
See application file for complete search history.

(56) References Cited

U.S. PATENT DOCUMENTS

2002/0070342 A1 6/2002 Berenz et al. ............... 250/353
2005/0122401 A1 6/2005 Horie .................... 348/207.99

FOREIGN PATENT DOCUMENTS

| EP | 1 324 597 A2 | 7/2003 |
| JP | 2003-195145 A | 7/2003 |
| KR | 10-2006-0104606 | 10/2006 |

OTHER PUBLICATIONS

International Search Report and Written Opinion dated Mar. 14, 2008, issued in corresponding PCT application No. PCT/IB2007/053967, 14 pages.

*Primary Examiner*—Rochelle-Ann J Blackman
(74) *Attorney, Agent, or Firm*—Harrity & Harrity, LLP

(57) ABSTRACT

A device may establish a distance of a device from a reference object. The device may also determine a difference or change in the distance, obtain a zoom value based on the difference or change, and zoom in or out on a view based on the zoom value.

15 Claims, 10 Drawing Sheets

ZOOM CONTROL

TECHNICAL FIELD OF THE INVENTION

Implementations described herein relate to photography and in particular, to controlling a zoom.

DESCRIPTION OF RELATED ART

When the size of a subject on the viewfinder of a camera is too small or too large, the optical zoom of the camera may be used to change the magnification of the subject image. The magnification may be changed by manually adjusting the zoom lens.

SUMMARY

According to one aspect, a method may comprise establishing a first distance between a device and a reference object, determining a difference between the first distance and a current distance between the device and the reference object, obtaining a zoom value based on the difference, and zooming in on a view based on the zoom value.

Additionally, establishing a first distance may include setting an output value of an accelerometer sensor to zero.

Additionally, determining the difference between the first distance and the current distance may include obtaining the output value from the accelerometer sensor.

Additionally, the reference object may be a user of the device or a portion of the user's body.

Additionally, the method may further comprise receiving a calibration value to be used for determining the zoom value.

Additionally, obtaining a zoom value based on the difference may include multiplying the calibration value by the difference.

Additionally, the method may further comprise setting a shutter speed or an aperture size based on the zoom value.

Additionally, the method may further comprise setting a shutter speed, a white balance, or an aperture size based on luminance sensor outputs.

Additionally, the method may further comprise focusing in on the view based on focus sensor outputs.

Additionally, the method may further comprise receiving a user input to terminate zooming in on the view.

Additionally, the method may further comprise capturing the view as an image.

According to another aspect, a device may comprise a lens assembly and a sensor. Additionally, the device may further comprise a processor to set a reference position of the device relative to a reference point based on information from the sensor, determine the distance of the device to the reference position, derive zoom information based on the distance, and adjust the lens assembly to magnify an image based on the zoom information.

Additionally, the sensor may include at least one of an accelerometer sensor that obtains the distance of the device to the reference position, an ultrasound sensor that obtains the distance of the device to the reference point, an infrared sensor that obtains the distance of the device to the reference point, or a camera sensor that obtains the distance of the device to the reference point.

Additionally, the accelerometer sensor may include an accelerometer.

Additionally, the camera sensor may include a video camera.

Additionally, the device may further comprise a light sensor to sense the image, a memory to capture the image, and a display to show the image.

Additionally, the sensor may include a luminance sensor for detecting brightness of the image.

Additionally, the sensor may include a focus sensor.

According to yet another aspect, a device may comprise means for obtaining a distance from the device to a user of the device, means for determining magnification based on the distance, and means for adjusting an optical zoom based on the magnification.

Additionally, the device may further comprise at least one of means for measuring acceleration and determining the distance based on the measured acceleration, means for measuring a delay between an ultrasound pulse and an echo of the ultrasound pulse and determining the distance based on the delay, or means for measuring video camera parameters and determining the distance based on the video camera parameters.

BRIEF DESCRIPTION OF THE DRAWINGS

The accompanying drawings, which are incorporated in and constitute a part of this specification, illustrate one or more embodiments described herein and, together with the description, explain the embodiments. In the drawings.

DETAILED DESCRIPTION OF EMBODIMENTS

The following detailed description refers to the accompanying drawings. The same reference numbers in different drawings may identify the same or similar elements.

The term "image," as used herein, may refer to a digital or an analog representation of visual information (e.g., a picture, a video, a photograph, animations, etc).

The term "camera," as used herein, may include a device that may capture and store images. For example, a digital camera may include an electronic device that may capture and store images electronically instead of using photographic film. A digital camera may be multifunctional, with some devices capable of recording sound and/or images.

A "subject," as the term is used herein, is to be broadly interpreted to include any person, place, and/or thing capable of being captured as an image.

EXEMPLARY DEVICE

Figure 1A:
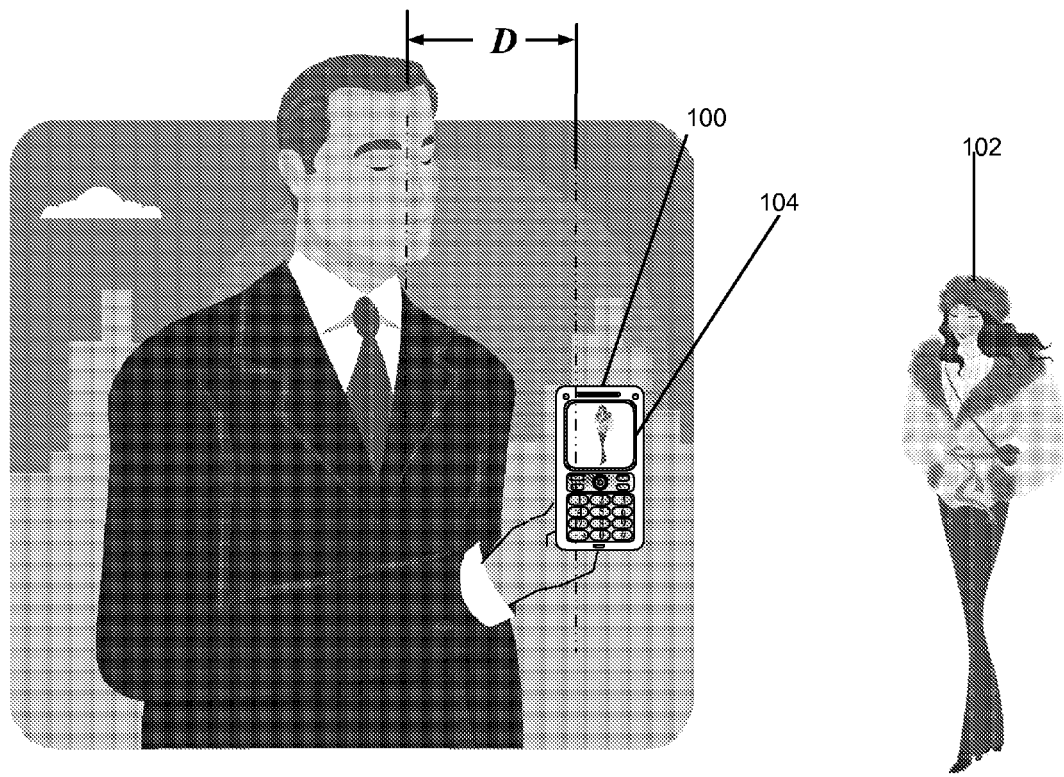
FIG. 1A shows a person using a device to take a picture of a subject.
Figure 1B:
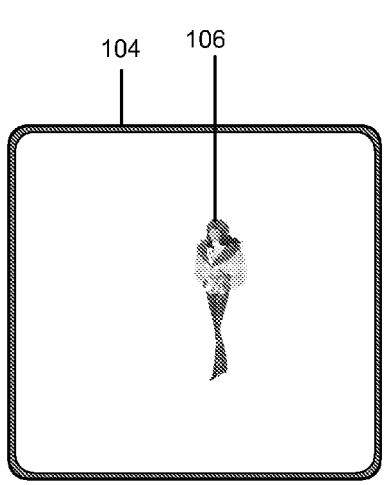
FIG. 1B shows an image of the subject of FIG. 1A, at a zoom, on the display screen of the device of FIG. 1A.
Figure 1C:
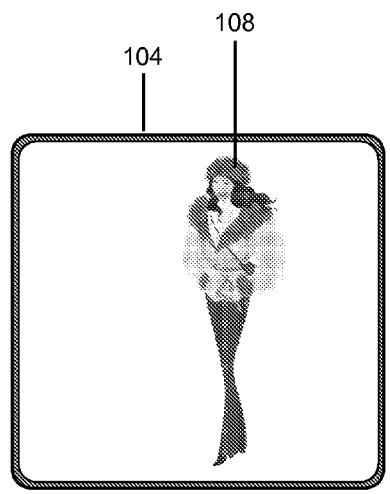
FIG. 1C shows an image of the subject of FIG. 1A, at another zoom, on the display screen of the mobile device of FIG. 1A.

In the following implementations, the optical zoom of a device may be controlled by changing the distance between a reference point and the device. FIG. 1A depicts a person using device 100 to take a picture of a subject 102. In FIG. 1B, an image 106 of subject 102 is shown on display 104 of device 100. If the person changes the distance D (FIG. 1A) between device 100 and a reference point (e.g., his face, his body, etc.), by pulling device 100 toward or away from the reference point, device 100 may detect the changes in distance D through its zoom sensor, use the detected changes to determine a new zoom value, and zoom in or out on subject 102 in accordance with the new zoom value. FIG. 1C shows image 108 on display 104 after zooming in on subject 102. By adjusting its zoom based on the distance between the reference point and device 100, device 100 allows its user to conveniently control the magnification of an image that is to be captured at device 100.

Figures 2A, 2B:
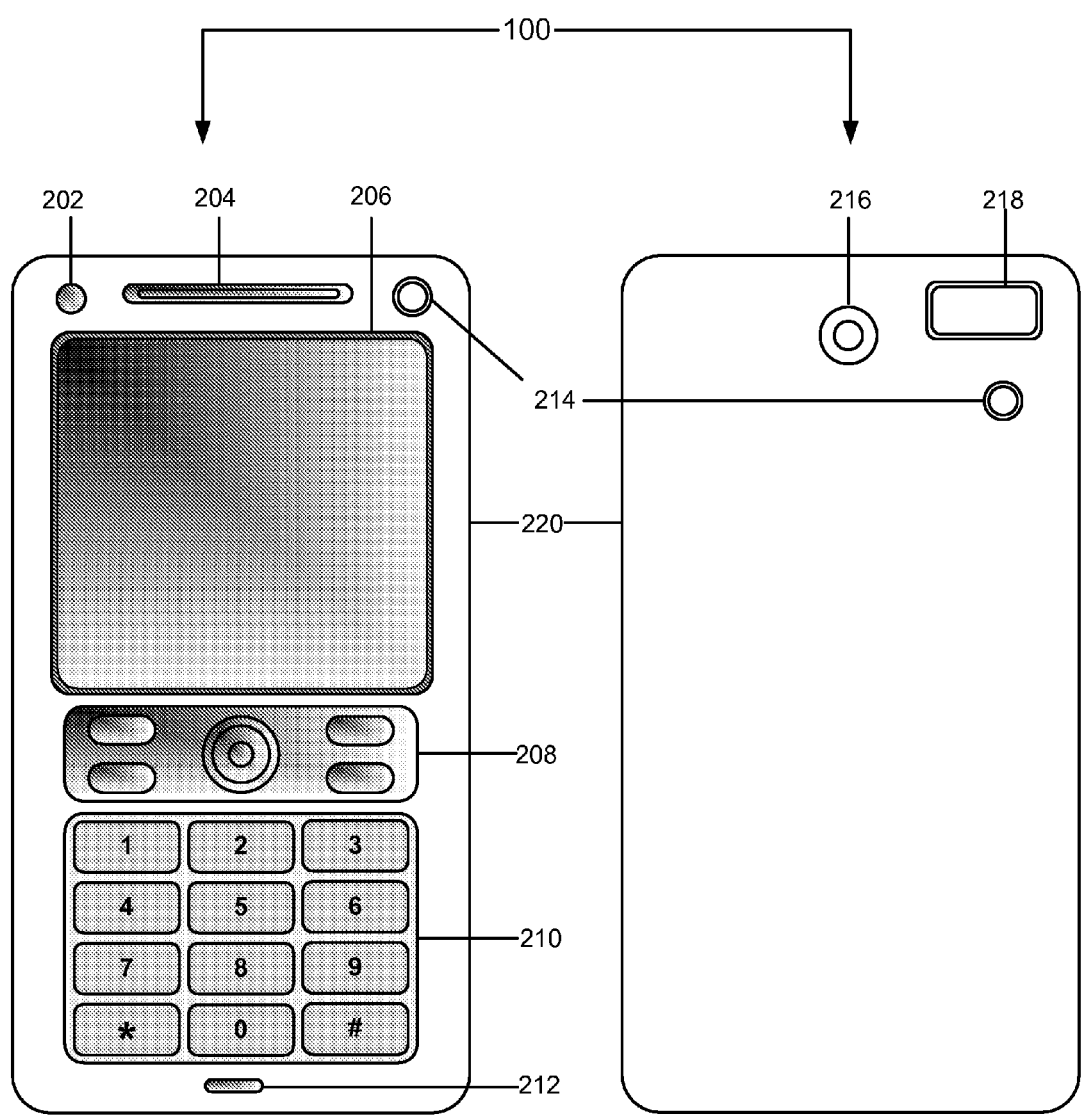
FIGS. 2A and 2B are front and rear views, respectively, of the device of FIG. 1A.

FIGS. 2A and 2B are front and rear views, respectively, of device 100 of FIG. 1A. In this implementation, device 100 may be a mobile terminal capable of making and receiving telephone calls. As illustrated, device 100 may include a front camera 202, a speaker 204, a display 206, control buttons 208, a keypad 210, a microphone 212, sensors 214, a lens assembly 216, a flash 218, and housing 220. Front camera 202 may enable a user to view, capture and store images (e.g., pictures, video clips) of a subject in front of device 100, and may be separate from lens assembly 216 that is located on the back of device 100. Speaker 204 may provide audible information to a user of device 100. Display 206 may provide visual information to the user, such as video images or pictures. Control buttons 208 may permit the user to interact with device 100 to cause device 100 to perform one or more operations, such as place or receive a telephone call. Keypad 210 may include a standard telephone keypad. Microphone 212 may receive audible information from the user. Sensors 214 may collect and provide, to device 100, information (e.g., acoustic, infrared, etc.) that is used to aid the user in capturing images. Lens assembly 216, which is separate from front camera 202, may include a device for manipulating light rays from a given or a selected range, so that images in the range can be captured in a desired manner. Flash 218 may include any type of flash unit used in cameras and may provide illumination for taking pictures. Housing 220 may provide a casing for components of device 100 and may protect the components from outside elements.

Figure 3:
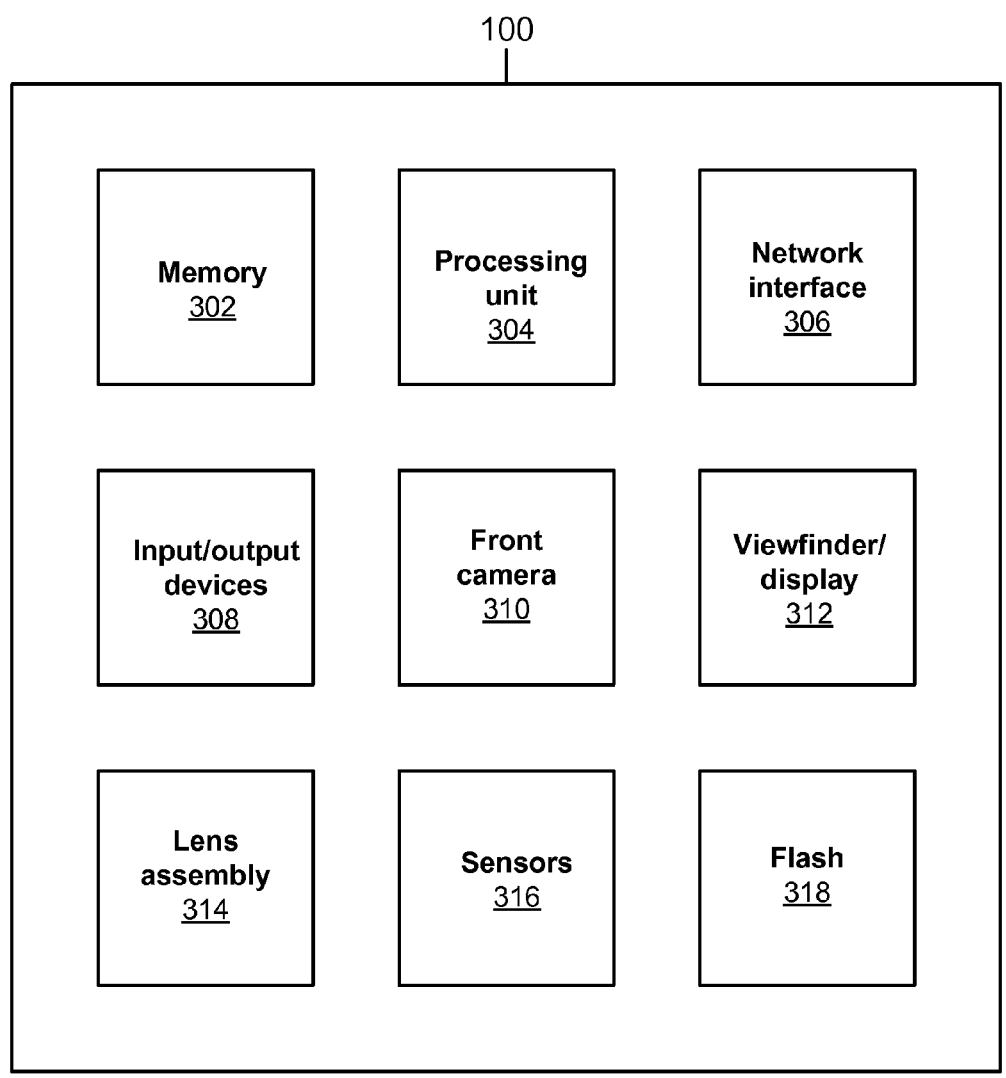
FIG. 3 is an exemplary block diagram of the device of FIG. 1A.

FIG. 3 shows an exemplary block diagram of device 100 of FIG. 1A. As shown, device 100 may include memory 302, a processing unit 304, a network interface 306, input/output devices 308, a front camera 310, a viewfinder/display 312, a lens assembly 314, sensors 316, and a flash 318. A bus (not shown) may interconnect the components illustrated in FIG. 3. In other implementations, device 100 may include more, fewer, or different components. For example, when device 100 takes the form of a non-digital camera, device 100 may include film.

Memory 302 may include static memory, such as read only memory (ROM), and/or dynamic memory, such as random access memory (RAM), or onboard cache, for storing data and machine-readable instructions. Memory 302 may also include storage devices, such as a floppy disk, CD ROM, CD read/write (R/W) disc, and/or flash memory, as well as other types of storage devices. Processing unit 304 may include one or more processors, microprocessors, and/or processing logic capable of controlling device 100. Network interface 306 may include any transceiver-like mechanism that enables device 100 to communicate with other devices and/or systems. For example, network interface 306 may include mechanisms for communicating via a network, such as the Internet, a terrestrial wireless network, a satellite-based network, etc. Additionally or alternatively, network interface 306 may include a modem, an Ethernet interface to a LAN, and/or an interface/connection for connecting device 100 to other devices. Input/output devices 308 may include a keyboard, keypad (e.g., keypad 210 of FIG. 2A), button (e.g., control buttons 208), mouse, speaker (e.g., speaker 204), microphone (e.g., microphone 212), Digital Video Disk (DVD) writer, DVD reader, Universal Serial Bus (USB) lines, and/or another type of device for converting physical events or phenomena to and/or from digital signals that pertain to device 100.

Front camera 310 may include devices to view, capture and store images (e.g., pictures, video clips) at device 100, and may provide image information to other components, such as memory 302, viewfinder/display 312, and/or sensors 316 for storage and for further processing. Viewfinder/display 312 may include a device that can display signals generated by device 100 as images on a screen and/or that can accept inputs in the form of taps or touches on the screen. For example, viewfinder/display 312 may provide a window through which the user may view images that are received from front camera 310 or lens assembly 314. Examples of viewfinder/display 312 include an optical viewfinder (e.g., a reversed telescope), a liquid crystal display (LCD), cathode ray tube (CRT) display, organic light-emitting diode (OLED) display, surface-conduction electron-emitter display (SED), plasma display, field emission display (FED), bistable display, and/or a touch screen.

Lens assembly 314 may include a device for manipulating light rays from a given or a selected range, so that images in the range can be captured in a desired manner. Lens assembly 314 may be controlled manually and/or electromechanically by processing unit 304 to obtain the correct focus and magnification (i.e., zoom) of the subject image and to provide a proper exposure. Sensors 316 may include one or more devices for obtaining information related to image, luminance, focus, and/or zoom. Sensors 316 may provide the information to processing unit 304, so that processing unit 304 may control lens assembly 314 and flash 318. Flash 318 may include any type of flash unit used in cameras. For example, flash unit 318 may include a flash unit built into device 100; a flash unit separate from device 100; an electronic xenon flash lamp (e.g., a tube filled with xenon gas, where electricity of high voltage is discharged to generate an electrical arc that emits a short flash of light); or a microflash (e.g., a special, high-voltage flash unit designed to discharge a flash of light with a sub-microsecond duration).

Figure 4:
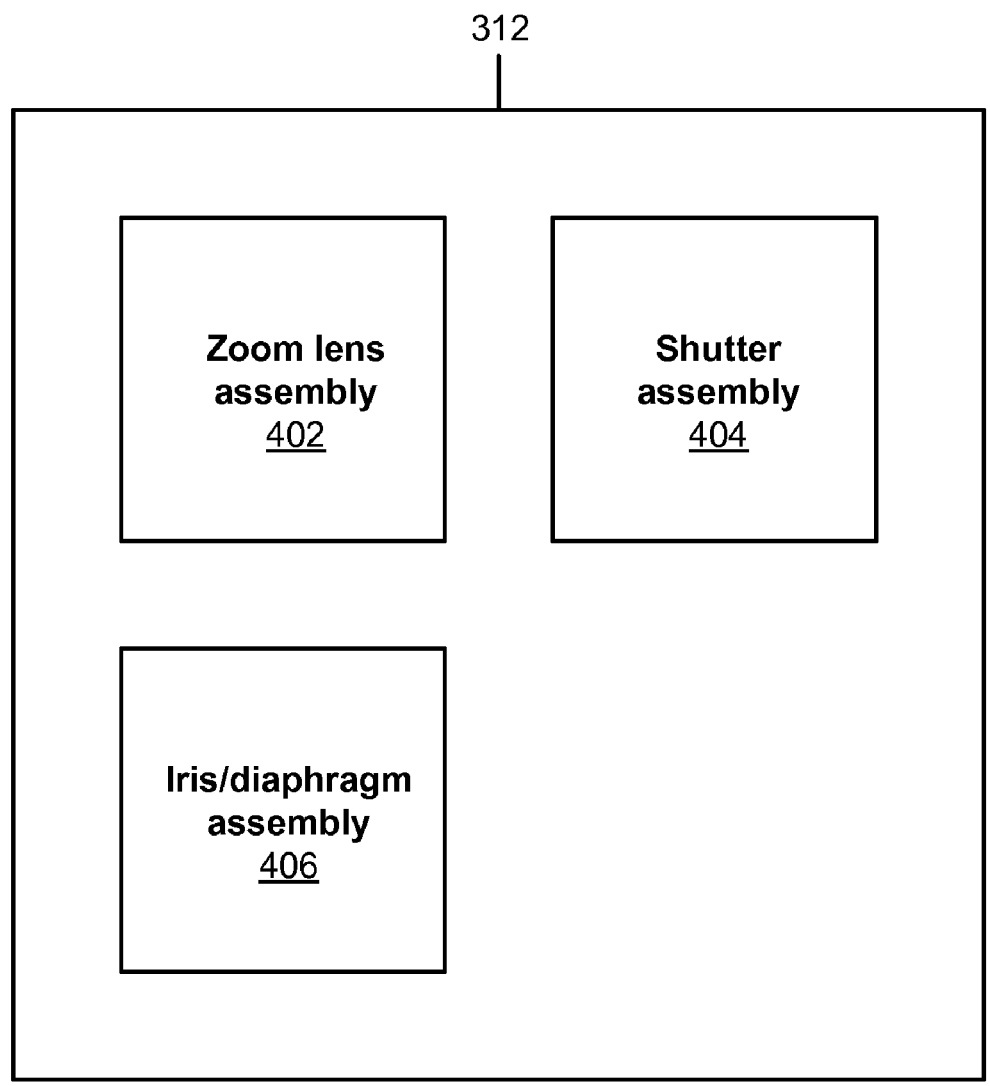
FIG. 4 is an exemplary block diagram of the lens assembly of FIG. 3.

FIG. 4 is an exemplary block diagram of lens assembly 314 of FIG. 3. As shown, lens assembly 314 may include zoom lens assembly 402, shutter assembly 404, and iris/diaphragm assembly 406. In other implementations, lens assembly 314 may include more, fewer, or different components.

Zoom lens assembly 402 may include a collection of lenses, and may provide a magnification and a focus of a given or selected image, by changing relative positions of the lenses. Shutter assembly 404 may include a device for allowing light to pass for a period of time. Shutter assembly 404 may expose sensors 316 to a determined amount of light to create an image of a view. Iris/diaphragm assembly 406 may include a device for providing an aperture for light and may control the brightness of light on sensors 316 by regulating the size of the aperture.

Zoom lens assembly 402, shutter assembly 404, and iris/diaphragm assembly 406 may operate in conjunction with each other to provide a desired magnification and an exposure. For example, when a magnification is increased by using zoom lens assembly 402, shutter assembly 404 and iris/diaphragm assembly 406 may be adjusted to compensate for changes in the amount of light, in order to maintain the exposure relatively constant.

Figure 5:
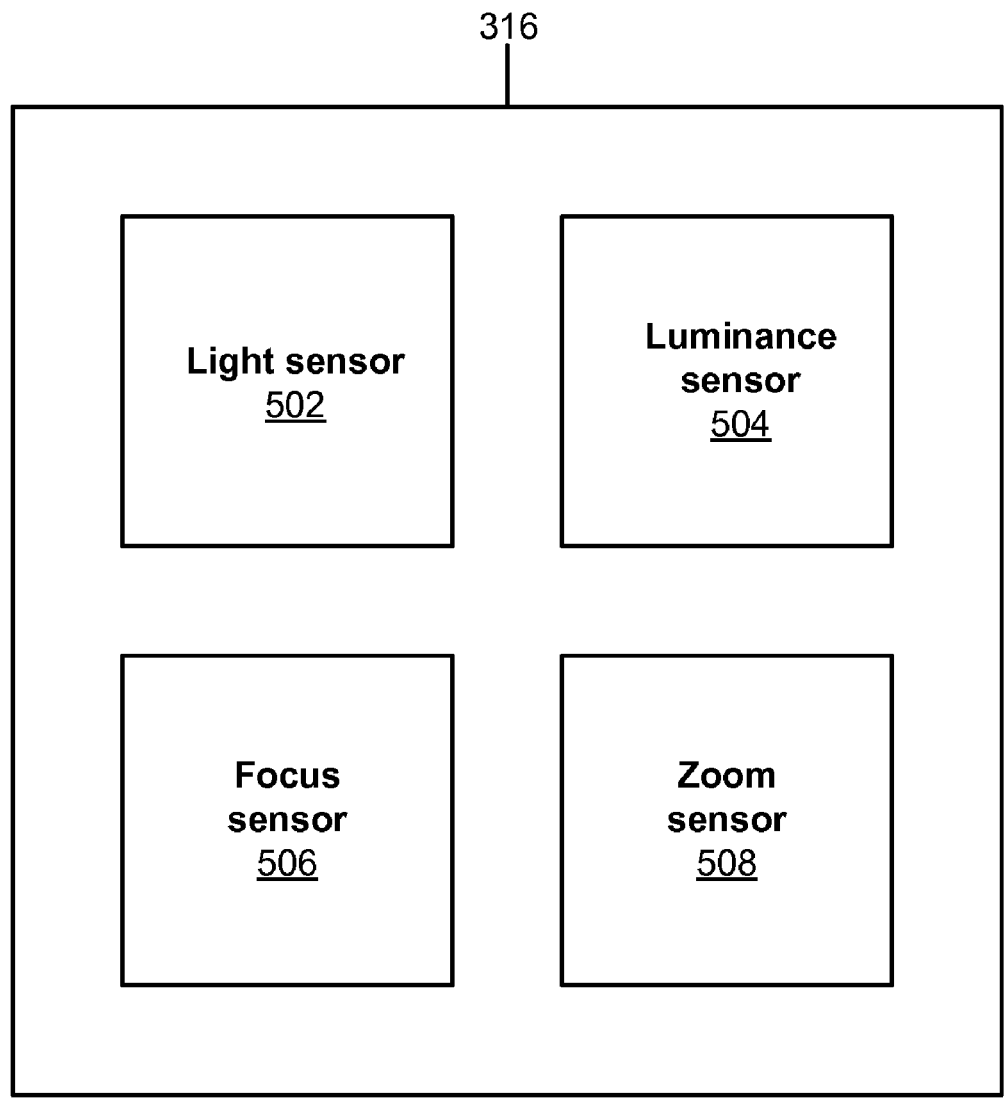
FIG. 5 is an exemplary block diagram of the sensors of FIG. 3.

FIG. 5 is an exemplary block diagram of sensors 316 of FIG. 3. As shown, sensors 316 may include a light sensor 502, luminance sensor 504, focus sensor 506, and zoom sensor 508. In another implementation, sensors 316 may include additional, fewer, or different components.

Light sensor 502 may include hardware and/or software for sensing light and storing an image. Luminance sensor 504 may include hardware and/or software for sensing the intensity of light (i.e., luminance) within a view. Luminance sensor 504 may provide luminance information that may be used for controlling flash 318 and the exposure of light sensor 502. An example of luminance sensor 504 includes a flash sensor. In one implementation, luminance sensor 504 may include a white point detector. The white point of a view may depend on light sources and may be used to white balance the view.

Focus sensor 506 may include hardware and/or software for providing information that may be used for focusing an image. In one implementation, focus sensor 506 may provide the distance of a subject from device 100, so that device 100 may adjust lens assembly 314 to obtain a properly focused image of the subject. In another implementation, focus sensor 506 may detect when lens assembly 314 outputs an image with the greatest contrast between measured light intensities at adjacent detector elements in sensors 316 and indicate the focused condition.

Zoom sensor 506 may include hardware and/or software for providing information about the distance between device 100 and a reference point. As illustrated in FIG. 1A, because the reference point may not be co-located with subject 102, focus sensor 506 may not necessarily provide to device 100 the information that zoom sensor 508 provides. That is, focus sensor 506 may provide distance information from device 100 to a subject, such as subject 102, for auto-focusing purposes. In contrast, zoom sensor 508 may provide distance information, such as distance D in FIG. 1A, to device 100. This distance may be used to modify a displayed image, as described below.

Figure 6:
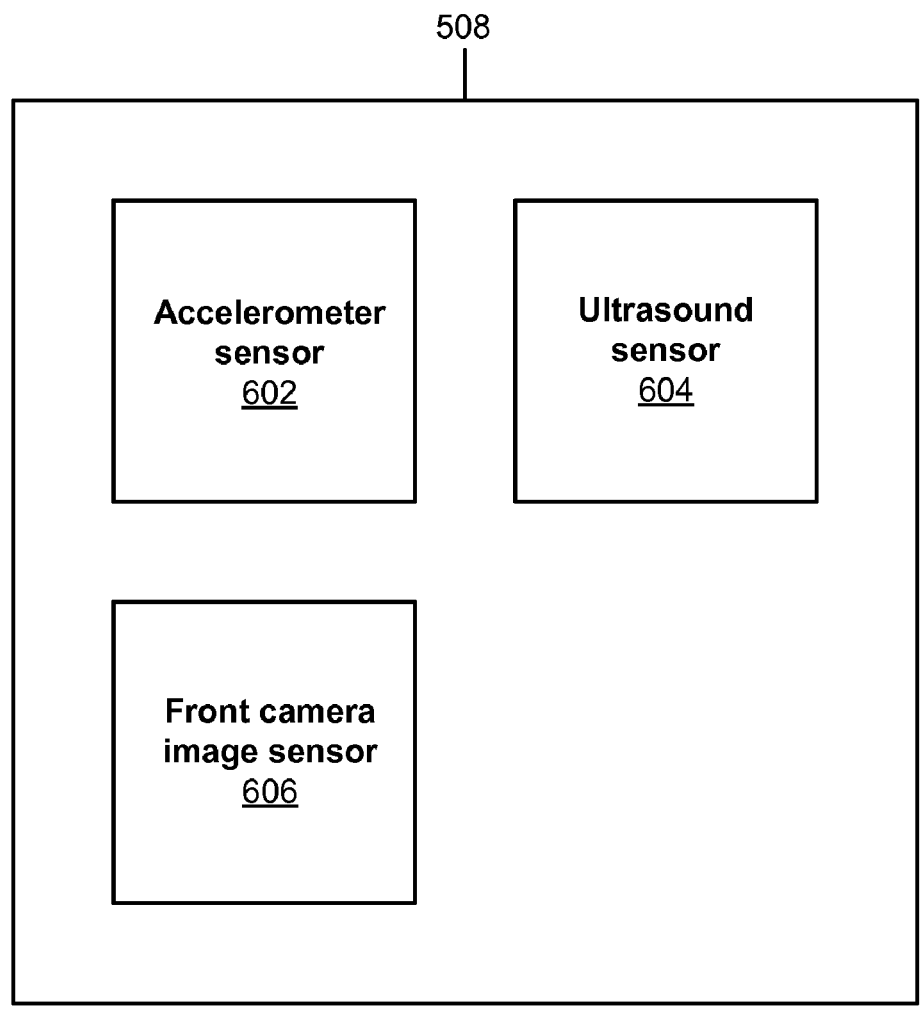
FIG. 6 is an exemplary block diagram of the zoom sensor of FIG. 5.

FIG. 6 is an exemplary block diagram of zoom sensor 508 of FIG. 5. As shown, zoom sensor 508 may include accelerometer sensor 602, ultrasound sensor 604, and front camera image sensor 606. In other implementations, zoom sensor 508 may include fewer, additional, or different types of sensors. For example, in one implementation, zoom sensor 508 may include an infrared sensor. In another example, zoom sensor 508 may include only accelerometer sensor 602 and exclude ultrasound sensor 604 and front camera image sensor 606.

Accelerometer sensor 602 may include hardware and/or software for determining acceleration of device 100 and for determining changes in the distance between device 100 and a reference point. Accelerometer sensor 602 may include an accelerometer for obtaining values of acceleration of device 100. The accelerometer may include a device such as a micro electro mechanical system (MEMS) accelerometer or a piezoelectric accelerometer that is coupled to the housing of device 100. The changes in the distance between device 100 and a reference point may be determined in accordance with acceleration information obtained from the accelerometer.

Ultrasound sensor 604 may include hardware and/or software for determining the distance between a reference point and device 100 by measuring the difference between the time at which an ultrasound probe pulse is transmitted from device 100 and the time at which the echo pulse corresponding to the probe pulse is received by device 100. Front camera image sensor 606 may include hardware and/or software for measuring the distance between a reference point (e.g., the user's face, body, etc.) associated with an image to be captured and device 100, by using an effective focal distance of front camera lenses and a distance of a focused image from its lenses.

Figure 7:
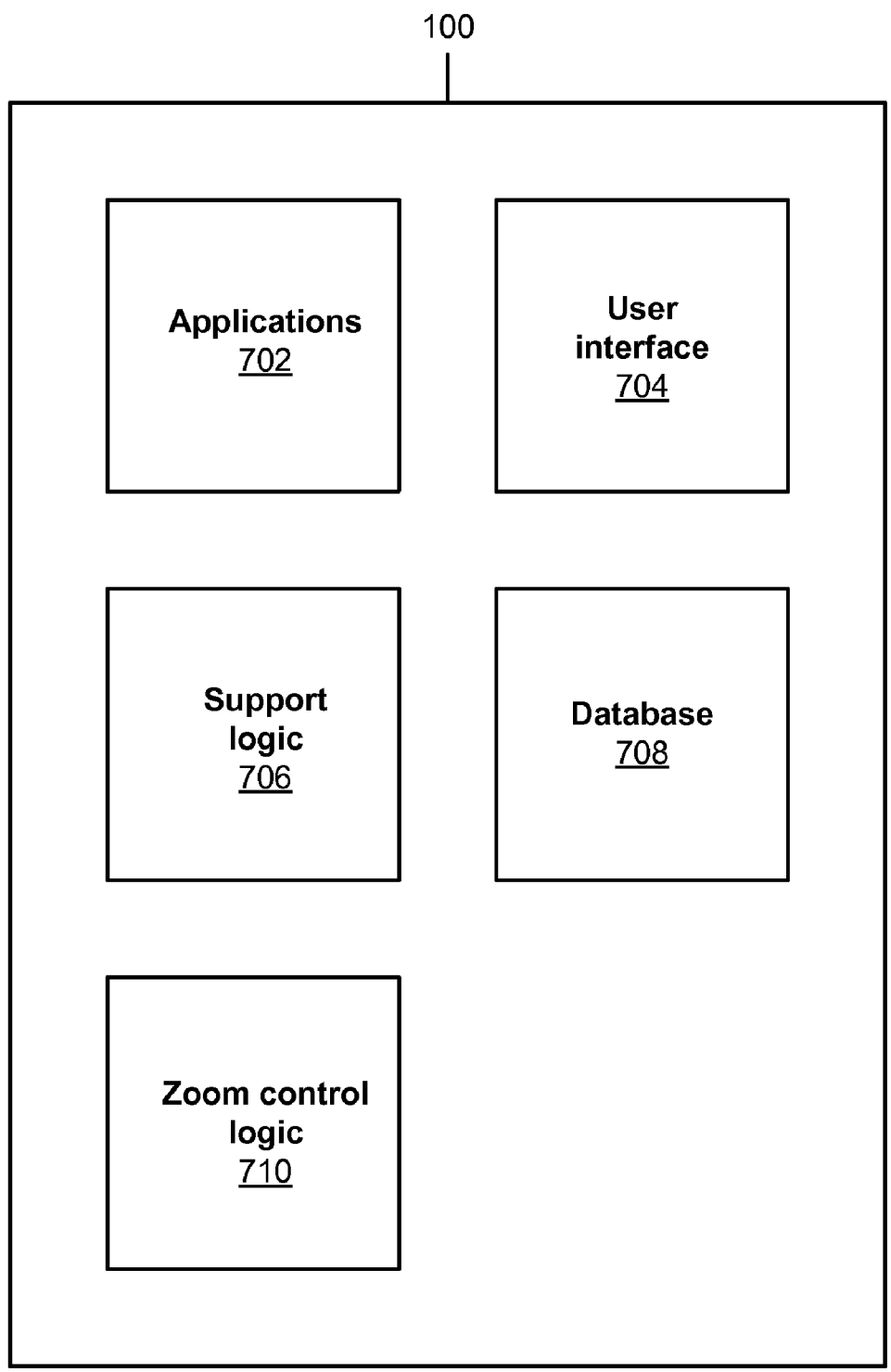
FIG. 7 is an exemplary functional block diagram of exemplary components that may be included in the device of FIG. 1A.

FIG. 7 is an exemplary functional block diagram of exemplary components that may be included in the device of FIG. 1A. Device 100 may include applications 702, user interface 704, support logic 706, database 708, and zoom control logic 710. In other implementations, device 100 may include fewer, additional, or different types of components than those illustrated in FIG. 7.

Applications 702 may include hardware and/or software for supporting various functionalities of device 100, such as text messaging, email, Multimedia Messaging, wireless (e.g., Bluetooth) communications, image capturing and storing, infrared communications, web access, file uploading and downloading, image transfer, etc.

User interface 704 may include hardware and/or software for allowing a user to interact with applications 702, support logic 706, database 708, and/or zoom control logic 710. In one implementation, for controlling zoom, user interface 704 may accept inputs that indicate the start or the end of a zoom control and calibration parameters that specify how much to magnify a subject per unit of distance that device 100 has changed or moved with respect to a reference point. For example, a user may input calibration parameters that instruct device 100 to magnify an image 20% per 1 inch decrease in the distance.

Support logic 706 may include hardware and/or software for performing various support functions for applications 702, user interface 704, database 708, and zoom control logic 710. For example, support logic 706 may provide interfaces between the components illustrated in FIG. 7 (e.g., applications 702, zoom control logic 710) and the components in FIG. 3 (e.g., network interface 306, input/output devices 308, front camera 310, viewfinder/display 312, etc.). In yet another example, support logic 706 may provide a TCI/IP stack to support communication applications.

Database 708 may act as an information repository for applications 702, user interface 704, support logic 706, and/or zoom control logic 710. For example, applications 702 may store and/or retrieve captured images and/or sounds to and from database 708. In another example, user interface 704 may store accepted input values for controlling zoom at database 708.

Zoom control logic 710 may include hardware and/or software that receive outputs from one or more of the subcomponents of zoom sensor 508 (FIG. 5), for determining new zoom values based on the outputs and/or calibration parameters that have been inputted, and for controlling zoom lens assembly 402 (FIG. 4) in accordance with the new zoom values. If a user has not supplied calibration parameters, default values may be used.

In one implementation, zoom control logic 710 may begin to use or receive outputs from accelerometer sensor 602 (FIG. 6) when a user signals zoom control logic 710, through one of input/output devices 308 (FIG. 3) (e.g., control buttons 208, keypad 210, etc.). For example, when the user activates a camera mode of device 100, zoom control logic 710 may automatically begin processing data from accelerometer sensor 602. Zoom control logic 710 may use the outputs, which reflect the changes in the distance between device 100 and a reference point (e.g., the user) after the occurrence of the signal, to determine a new zoom for zoom lens assembly 402. Zoom control logic 710 may cause lens assembly 314 (i.e., zoom lens assembly 402, shutter assembly 404, and iris/diaphragm assembly 406) to adjust in accordance with the new zoom.

In other implementations, zoom control logic 710 may use outputs from others components of zoom sensor 508, such as ultrasound sensor 604 or front camera image sensor 606, in the manner similar to that described above for accelerometer sensor 602. In still other implementations, zoom sensor 508 may use the outputs from one or more of the accelerometer sensor 602, ultrasound sensor 604, or front camera image sensor 606 to determine a new zoom and adjust zoom lens assembly 402. In determining the new zoom, the outputs of the accelerometer sensor 602, ultrasound sensor 604, and/or front camera image sensor 606 may be averaged or may be used together to obtain a more accurate zoom value.

EXEMPLARY PROCESS FOR CONTROLLING ZOOM

Figure 8:
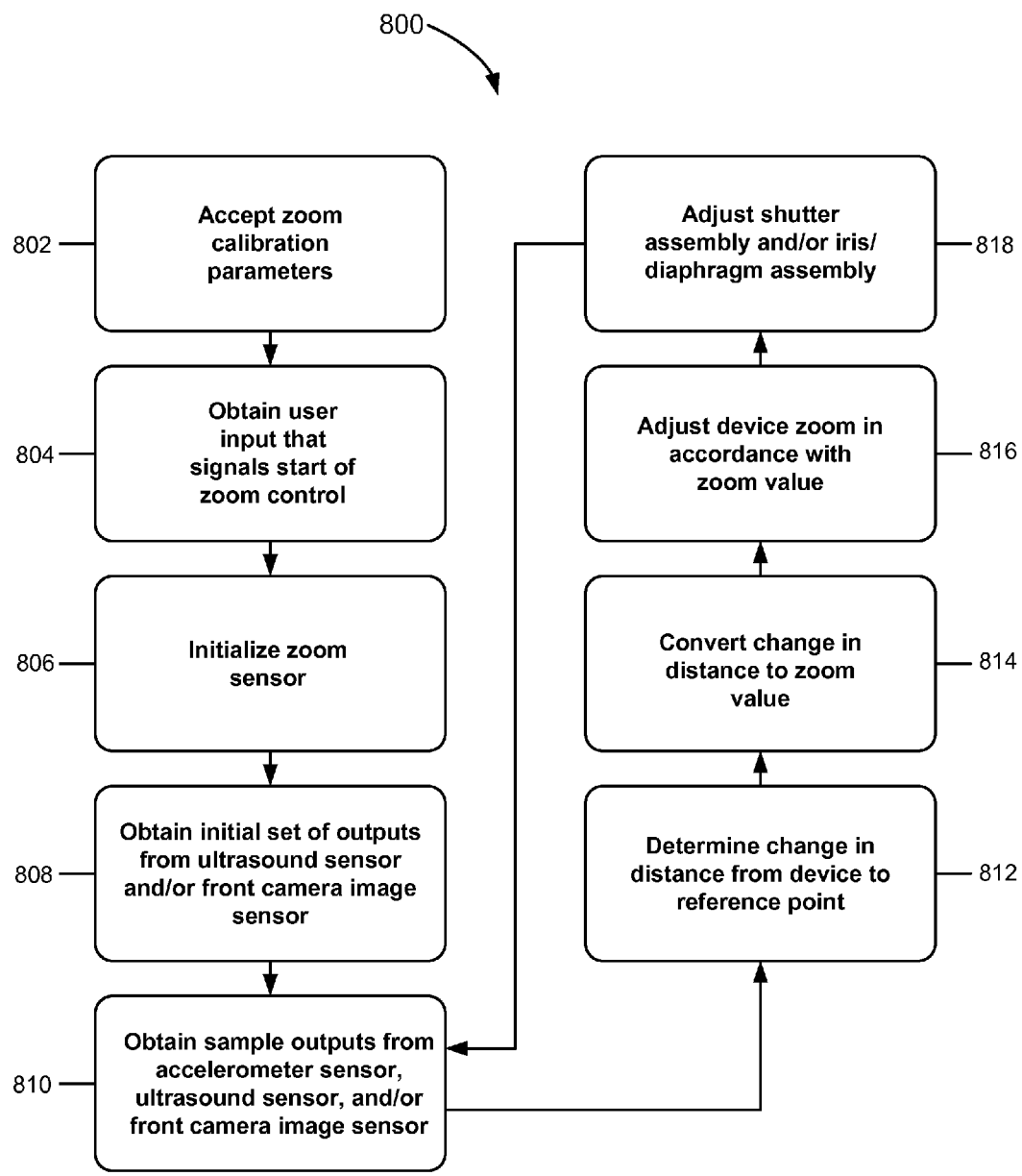
FIG. 8 illustrates an exemplary process for controlling a zoom based on the distance between a reference point and the device of FIG. 1A.

FIG. 8 shows an exemplary process for controlling a zoom based on the distance between a reference point and the device of FIG. 1A. At block 802, zoom calibration parameters may be accepted. As described above, a user may provide calibration parameters. If no calibration parameters are provided, default values may be used.

At block 804, a user input that signals the start of a zoom control may be obtained (e.g., clicking on one of control buttons 208 (FIG. 2A), activating a camera mode of device 100, etc.).

At block 806, zoom sensor 508 may be initialized. Initializing zoom sensor 508 may signal accelerometer sensor 602 to reset measurement values to zero and cause ultrasound sensor 604 and front camera image sensor 606 to determine the reference distance between a reference point (e.g., the user's body, the user's face, etc.) and device 100.

At block 808, an initial set of outputs from ultrasound sensor 604 and/or front camera image sensor 606 may be obtained. The outputs may relate the initial distance between the reference point, such as a user, and device 100.

At block 810, sample outputs from accelerometer sensor 602, ultrasound sensor 604, and/or front camera image sensor 606 may be obtained. The sample outputs of accelerometer sensor 602 relate the change in the distance between the reference point and device 100 after initializing zoom sensor 508. The sample outputs of ultrasound sensor 604 or front camera image sensor 606 relate the current distance between the reference point and device 100.

At block 812, a change in distance from device 100 to the reference point may be determined. For accelerometer sensor 602, the change in distance from device 100 to the reference point may be the same as its output. For ultrasound sensor 604 or front camera image sensor 606, the change in distance may be given by the difference between its output at block 810 and its initial output at block 808.

At block 814, the change in distance may be converted to a zoom value. The conversion may be obtained by multiplying the change in distance by the calibration value. For example, if the user in FIG. 1A moves device 100 two inches closer to the user's body and the calibration value indicates that optical magnification of the image is to increase 20% per 1 inch decrease in the distance D (FIG. 1A), the zoom value may be $(100+20)^2\% = 144\%$. The calibration parameters may also indicate that optical magnification of the image is to decrease 20% per 1 inch increase in the distance D in FIG. 1A.

At block 816, the zoom of device 100 may be adjusted in accordance with the zoom value. In the same example described above, adjusting the zoom of device 100 may enlarge image 106 in FIG. 1B by 144%, to result in image 108 in FIG. 1C. In some implementations, device 100 may be configured to decrease the size of the image when device 100 moves closer to the reference point, and increase the size of the image when device 100 moves further away, based on the user's preference. In this case, when device 100 is moved two inches closer to the user, the zoom value may be determined as $(100-20)^2\% = 64\%$, and the image may be made smaller by 36%.

At block 818, shutter assembly 404 and iris/diaphragm assembly 406 may be adjusted to compensate for any changes in white balance, focus, and/or exposure due to changes in zoom.

The relationship between the iris/diaphragm opening size and shutter speed (exposure time) may be given by:

$$N^2/t = I\,S/K, \quad (1)$$

where N measures the ratio of the focal distance of the lens to iris/diaphragm opening (i.e., relative aperture), t is the shutter speed, I is the average luminance, S is the sensitivity of film to light, and K is a calibration constant.

When a zoom and/or a view changes, the shutter speed and the aperture size may be adjusted in accordance with equation (1). Depending on the specific implementation of zoom lens assembly 402, adjusting the magnification may affect its focal distance, which in turn may affect N in equation (1). In addition, changing a view may affect the luminance, I.

At block 818, process 800 returns to 810, unless process 800 is terminated by the user through an input. That is, as the user moves device 100 closer and/or further from the reference point (e.g., his/her face, body, etc), zoom parameters may be determined and magnification of a subject displayed via display 206 (FIG. 1A) may be changed without requiring the user to manually adjust a zoom controller.

ALTERNATIVE IMPLEMENTATION

Figure 9A:
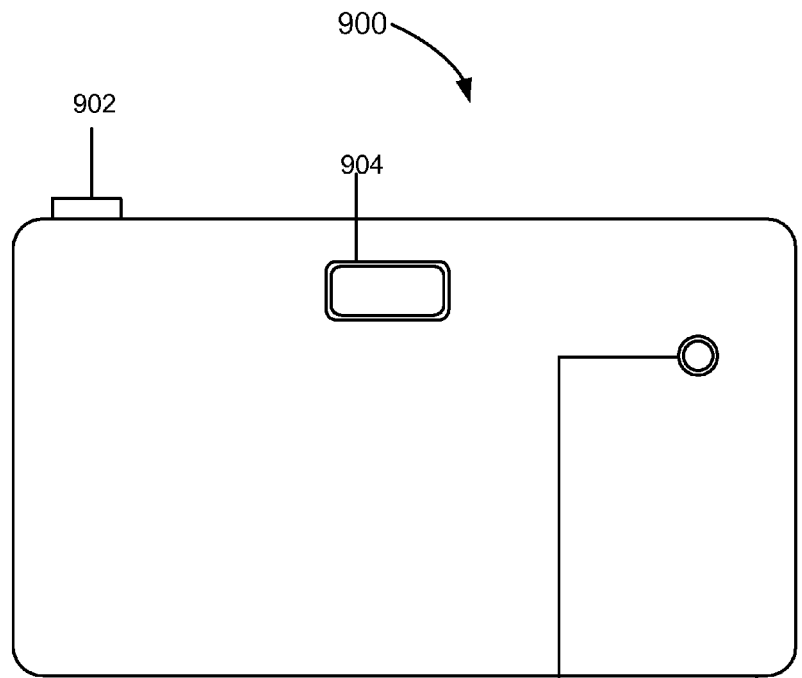
FIGS. 9A and 9B are rear and front views, respectively, of another exemplary device in which the systems and methods described herein can be implemented.
Figure 9B:
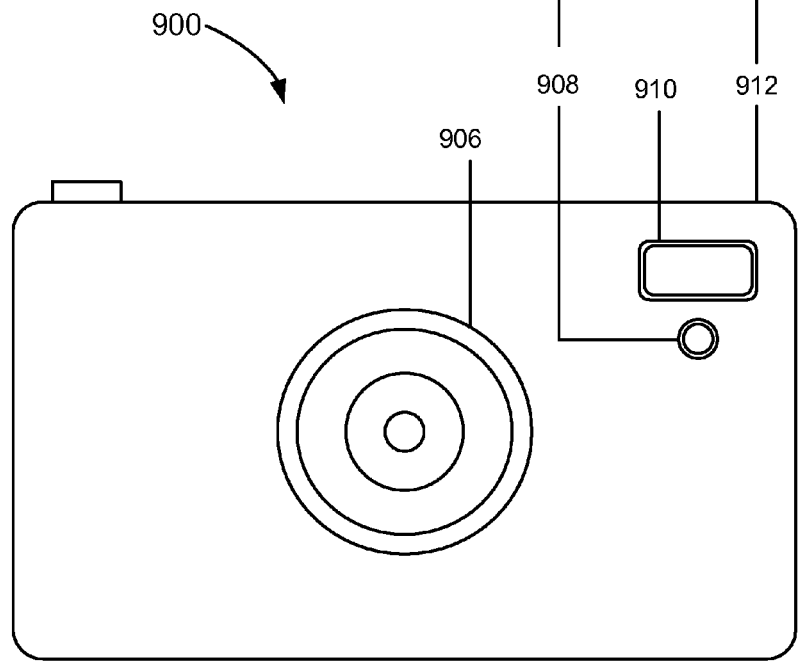

FIGS. 9A and 9B are rear and front views, respectively, of another exemplary device in which the systems and methods described herein can be implemented. In this implementation, device 900 may take the form of a camera (e.g., a standard camera) with or without additional communication functionality, such as the ability to make or receive telephone calls. As shown in FIG. 9A, device 900 may include a button 902, a viewfinder 904, a lens assembly 906, sensors 908, a flash 910, and housing 912. Button 902, viewfinder 904, lens assembly 906, sensors 908, flash 910, and housing 912 may include components that are similar to control buttons 208, display 206, lens assembly 216, sensors 214, flash 218, and housing 220, and may operate similarly. While not shown, device 900 may also include components that have been described with references to FIGS. 2-7.

EXAMPLE

Figure 10A:
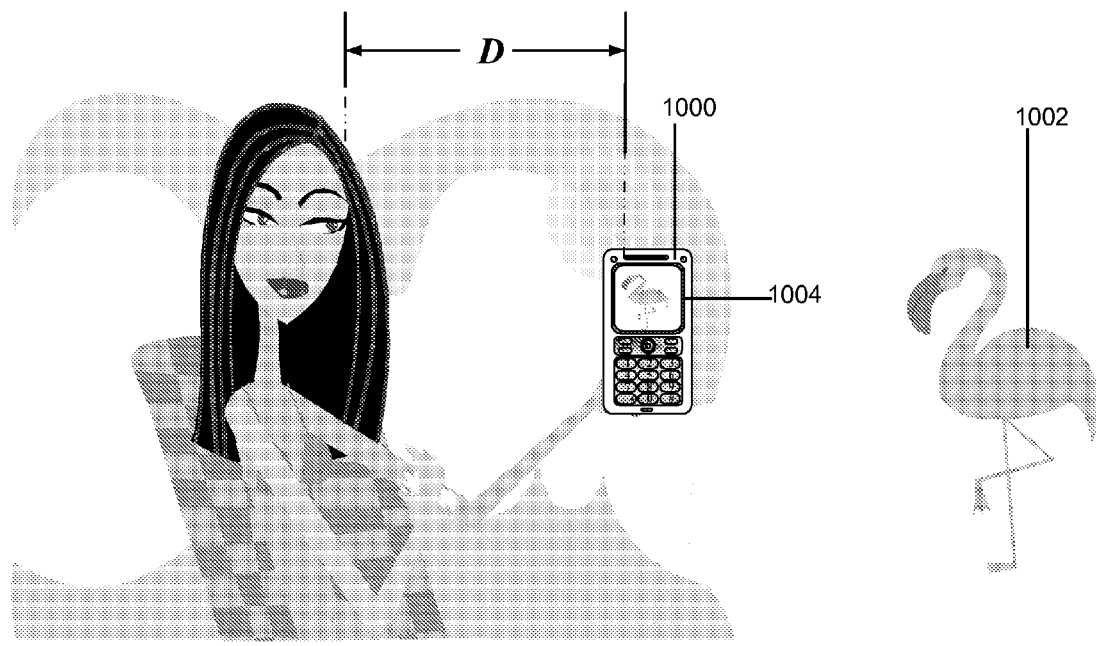
FIG. 10A shows a person using a device to take a picture of a subject.
Figure 10B:
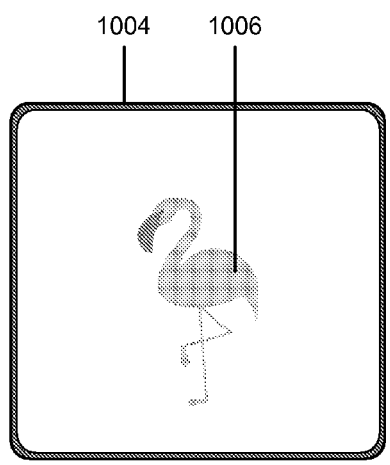
FIG. 10B shows an image of the subject of FIG. 10A, at a zoom, on the display screen of the device of FIG. 10A.
Figure 10C:
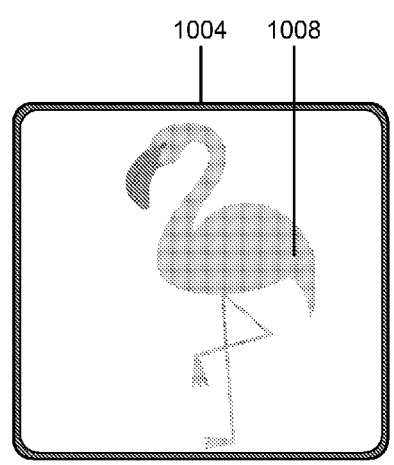
FIG. 10C shows an image of the subject of FIG. 10A, at another zoom, on the display screen of the mobile device of FIG. 10A.

The following example illustrates processes involved in controlling optical zoom, with reference to FIG. 10A-C. The example is consistent with the exemplary process described above with reference to FIG. 8.

Assume that Brigitte is on her vacation at a beach. Brigitte, who has started rubbing some tanning lotion on her skin, notices a bird 1002 and decides to take a picture of bird 1002. Because her right hand is full of tanning lotion, Brigitte takes her camera 1000 with her left hand. FIG. 10B illustrates image 1006 of bird 1002 on a display 1004 of her camera 1000. Finding the size of image 1006 too small, Brigitte decides to zoom in on bird 1002. She clicks on a control button (not shown) to begin zooming. Alternatively, camera 1000 may automatically begin zooming without input from Brigitte based on camera 1000 being activated (e.g., turned on).

In each case, camera 1000 measures the distance from camera 1000 to Brigitte (i.e., reference point). As Brigitte pulls camera 1000 toward her body, camera 1000 continues to measure changes in the distance between camera 1000 and Brigitte, to determine zoom values, and to show images on display 1004 that are magnified in accordance with the zoom values. When Brigitte sees image 1008, as illustrated in FIG. 10C, Brigitte may decide to take a picture. Brigitte may also further adjust the size of image 1008 by moving camera 1000 away from her body or zoom in further by moving camera 1000 closer to her body. In this manner, simplified zoom control may be achieved by simply moving camera 1000.

CONCLUSION

The foregoing description of embodiments provides illustration, but is not intended to be exhaustive or to limit the embodiments to the precise form disclosed. Modifications and variations are possible in light of the above teachings or may be acquired from practice of the teachings.

For example, while series of blocks have been described with regard to processes illustrated in FIG. 8, the order of the blocks may be modified in other implementations. For example, block 808 may be performed prior to block 806. If zoom sensor 508 includes only accelerometer sensor 602, block 808 and 810 may be omitted. In addition, non-dependent blocks may represent acts that can be performed in parallel to other blocks.

It will be apparent that aspects described herein may be implemented in many different forms of software, firmware, and hardware in the implementations illustrated in the figures. The actual software code or specialized control hardware used to implement aspects should not be construed as limiting. Thus, the operation and behavior of the aspects were described without reference to the specific software code—it being understood that software and control hardware can be designed to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

It should be emphasized that the term "comprises/comprising" when used in this specification is taken to specify the presence of stated features, integers, steps or components but does not preclude the presence or addition of one or more other features, integers, steps, components, or groups thereof.

Further, certain portions of the invention have been described as "logic" that performs one or more functions. This logic may include hardware, such as a processor, an application specific integrated circuit, or a field programmable gate array, software, or a combination of hardware and software.

What is claimed is:

1. A method comprising:
   establishing, via an ultrasonic sensor provided in a device, a first distance between the device and a user of the device, where the user is different than a subject to be captured by the device;
   receiving, via the device, a first image of the subject;
   receiving, via an accelerometer sensor provided in the device, an acceleration associated with the device;
   determining, via the device, a second distance between the device and the user based on the acceleration, where the second distance is different than the first distance;
   determining, via the device, a difference between the first distance and the second distance;
   obtaining, via the device, a zoom value based on the determined difference;
   zooming, via the device, on the subject based on the zoom value;
   setting a focus, a shutter speed and an aperture size, associated with the device, based on the zoom value; and
   capturing, via the device, a second image of the subject, based on zooming on the subject and setting the focus, the shutter speed, and the aperture size.

2. The method of claim 1, where establishing a first distance includes:
   setting an output value of the accelerometer sensor to zero.

3. The method of claim 2, where determining the difference between the first distance and the second distance includes:
   obtaining another output value from the accelerometer sensor.

4. The method of claim 1, where a portion of a body of the user is used when establishing the first distance and when determining the second distance.

5. The method of claim 1, further comprising:
   receiving a calibration value to be used for determining the zoom value, where the calibration value includes a value that represents an amount to change the zoom value per unit of the difference between the first distance and the second distance.

6. The method of claim 5, where obtaining a zoom value based on the determined difference includes:
   multiplying the calibration value by the determined difference.

7. The method of claim 1, further comprising:
   receiving outputs from a luminance sensor provided in the device; and
   setting, based on the luminance sensor outputs, a white balance of the second image associated with the device, where setting the shutter speed and the aperture size is further based on the luminance sensor outputs.

8. The method of claim 1, further comprising:
   receiving outputs from a focus sensor provided in the device;
   focusing in on the subject based on the focus sensor outputs.

9. The method of claim 1, further comprising:
receiving, from the user, an input to terminate zooming on the subject.

10. The method of claim 9, where
capturing the second image of the subject is in response to receiving the input to terminate zooming on the subject.

11. A device comprising:
a lens assembly;
an ultrasonic sensor
an acceleration sensor; and
a processor to:
- receive an image of a subject to be captured by the device,
- set a reference position of the device relative to a user of the device based on information received from the ultrasonic sensor, where the user is different than the subject,
- receive, from the acceleration sensor, an acceleration associated with the device,
- determine a distance between the device and the user based on the received acceleration,
- derive zoom information based on the determined distance,
- set a focus, a shutter speed and an aperture size, associated with the device, based on the zoom information; and
- adjust the lens assembly to magnify the image of the subject based on the zoom information, the focus, the shutter speed, and the aperture size, and
- capture the magnified image of the subject.

12. The device of claim 11, further comprising:
a light sensor to sense the image;
a memory to store the magnified image; and
a display to show the magnified image.

13. The device of claim 11, further comprising:
a luminance sensor that detects a brightness of the image.

14. The device of claim 11, further comprising:
a focus sensor.

15. A device comprising:
- means for obtaining a distance from the device to a user of the device, including means for measuring a time between an ultrasound pulse and an echo of the ultrasound pulse and determining the distance based on the time;
- means for capturing a fist image of a subject, where the subject is different from the user;
- means for measuring acceleration of the device;
- means for determining a change in the distance based on the measured acceleration
- means for determining magnification based on the determined change in the distance;
- means for adjusting an optical zoom based on the magnification;
- means for setting a focus, a shutter speed, and an aperture size, associated with the device, based on the adjusted optical zoom; and
- means for capturing a second image based on the adjusted optical zoom, the focus, the shutter speed; and the adjusted aperture size.

* * * * *